US009055447B2

(12) United States Patent
Cvijetic

(10) Patent No.: US 9,055,447 B2
(45) Date of Patent: Jun. 9, 2015

(54) MOBILE BACKHAUL TOPOLOGY PLANNING AND/OR OPTIMIZATION

(71) Applicant: NEC Laboratories America, Inc., Princeton, NJ (US)

(72) Inventor: Neda Cvijetic, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 4 days.

(21) Appl. No.: 14/182,479

(22) Filed: Feb. 18, 2014

(65) Prior Publication Data
US 2014/0233424 A1    Aug. 21, 2014

Related U.S. Application Data

(60) Provisional application No. 61/766,981, filed on Feb. 20, 2013.

(51) Int. Cl.
*H04W 16/18*    (2009.01)

(52) U.S. Cl.
CPC .................... *H04W 16/18* (2013.01)

(58) Field of Classification Search
CPC ..... H04W 16/18; H04W 28/22; H04W 52/24; H04W 28/0257; H04W 28/0268
USPC .......................................... 370/254, 252, 255
See application file for complete search history.

(56) References Cited

U.S. PATENT DOCUMENTS

2012/0195219 A1* 8/2012 Ko et al. .................. 370/252

OTHER PUBLICATIONS

S. Toumpis and A. J. Goldsmith, "Capacity regions for wireless ad hoc networks," IEEE Trans. Wireless Commun., vol. 2, pp. 189-205, Jul. 2003.
M. Franceschetti, O. Dousse, D. Tse, and P. Thiran, "Closing the gap in the capacity of wireless networks via percolation theory," IEEE Trans. Inf. Theory, vol. 53, pp. 1009-1018, Mar. 2007.
P. Li, C. Zhang, and Y. Fang, "Capacity and delay of hybrid wireless broadband access networks," IEEE J. Sel. Areas Commun., vol. 27, No. 2, pp. 117-125, Feb. 2009.
A. Reznik, S. R. Kulkarni, and S. Verdu, "A small world approach to heterogeneous networks," Commun. Inf. Systems, vol. 3, pp. 325-348, Sep. 2003.
M. Xia, Y. Owada, M. Inoue, H. Harai, "Optical and Wireless Hybrid Access Networks: Design and Optimization," OSA Jnl. Opt. Commun. Netw. (JOCN), vol. 4, No. 10, Oct. 2012.
N. Yoshimoto, "Next-Generation Access for Mobile Backhaul Application," Proc. the 17th OptoElectronics and Communications Conference (OECC 2012), paper 6A1-1.
N. Cvijetic, A. Tanaka, M. Cvijetic, Yue-Kai Huang, E. Ip, Y. Shao, and T. Wang, "Novel Optical Access and Digital Processing Architectures for Future Mobile Backhaul," J. Lightwave Technol., vol. 31, No. 4, pp. 621-627, Feb. 2013.
Julius Robson, 'Small Cell Backhaul Requirements', NGMN Alliance, Jun. 4, 2012 (https://www.ngmn.org/uploads/media/NGMN_Whitepaper_Small_Cell_Backhaul_Requirements.pdf) See section 3.5; and figure 14.

* cited by examiner

*Primary Examiner* — Kwang B Yao
*Assistant Examiner* — Syed M Bokhari
(74) *Attorney, Agent, or Firm* — Joseph Kolodka

(57) ABSTRACT

A method implemented in a network controller used in a mobile backhaul (MBH) network is disclosed. The method includes receiving one or more physical layer parameters from MBH transceivers in the MBH network, computing an admissible set of rate matrices, computing a capacity region based on the admissible set of rate matrices, deciding MBH transmission topology, and transmitting the decision to the MBH transceivers. Other apparatuses, systems, and methods also are disclosed.

11 Claims, 4 Drawing Sheets

MOBILE BACKHAUL TOPOLOGY PLANNING AND/OR OPTIMIZATION

This application claims the benefit of U.S. Provisional Application No. 61/766,981, entitled "Software-defined Throughput Optimization for Next-Generation Optical Mobile Backhaul," filed on Feb. 20, 2013, the contents of which are incorporated herein by reference.

BACKGROUND OF THE INVENTION

The present invention relates to mobile backhaul (MBH) topology and, more particularly, to MBH transmission topology planning and/or optimization.

Due to the massive proliferation of smart mobile devices, the mobile backhaul (MBH) and access networks of many leading global operators are evolving on a rapid, almost day-to-day basis. Due to the heterogeneity of MBH technologies (e.g. point-to-point microwave, copper, optical fiber), topologies within a given technology (e.g. line-of-sight versus non-line-of-sight wireless; free-space optical; point-to-point versus passive optical network (PON) fiber; etc.), and very different operator-specific legacy network investments and architectures, the optimization and future-proofing of the emerging high-speed MBH network emerges as a very difficult problem. We attempt to solve this problem by translating it into a malleable data rate optimization problem that incorporates physical layer parameters and can be solved in a software-defined way on a per-case, per-operator basis, and can thus act as both an a priori network planning tool, as well as a posteriori network upgrade/optimization tool.

Previous studies have considered optimal wireless access base station site placement in networks with randomly distributed mobile users [1-3], assuming that the wireless access points are either not connected or are a priori interconnected with a backhaul infrastructure. However, the optimization of the backhaul infrastructure itself was not considered; it was simply taken to be either present a priori, or absent altogether. In [4], a highly theoretical study arguing for a posteriori backhaul infrastructure optimization was presented (i.e. building a backhaul infrastructure after learning mobile user traffic patterns and distribution), but such an optimization was not performed, and the theoretical study was moreover not related to concrete physical-layer parameters. In most recent studies [5], physical-layer parameters have likewise not been explicitly taken into account.

REFERENCES

[1] S. Toumpis and A. J. Goldsmith, "Capacity regions for wireless ad hoc networks," *IEEE Trans. Wireless Commun.*, vol. 2, pp. 189-205, July 2003.
[2] M. Franceschetti, O. Dousse, D. Tse, and P. Thiran, "Closing the gap in the capacity of wireless networks via percolation theory," *IEEE Trans. Inf. Theory*, vol. 53, pp. 1009-1018, March 2007.
[3] P. Li, C. Zhang, and Y. Fang, "Capacity and delay of hybrid wireless broadband access networks," *IEEE J. Sel. Areas Commun.*, vol. 27, no. 2, pp. 117-125, February 2009.
[4] A. Reznik, S. R. Kulkarni, and S. Verdu, "A small world approach to heterogeneous networks," *Commun. Inf. Systems*, vol. 3, pp. 325-348, September 2003.
[5] M. Xia, Y. Owada, M. Inoue, H. Harai, "Optical and Wireless Hybrid Access Networks: Design and Optimization," OSA Jnl. Opt. Commun. Netw. (JOCN), vol. 4, no. 10, October 2012.
[6] N. Yoshimoto, "Next-Generation Access for Mobile Backhaul Application," Proc. The 17th OptoElectronics and Communications Conference (OECC 2012), paper 6A1-1.
[7] N. Cvijetic, A. Tanaka, M. Cvijetic, Yue-Kai Huang, E. Ip, Y. Shao, and T. Wang, "Novel Optical Access and Digital Processing Architectures for Future Mobile Backhaul," J. Lightwave Technol., vol. 31, No. 4, pp. 621-627, February 2013.

BRIEF SUMMARY OF THE INVENTION

An objective of the present invention is to solve the problem of optimization and future-proofing of the emerging high-speed MBH network.

An aspect of the present invention includes a method implemented in a network controller used in a mobile backhaul (MBH) network. The method comprises receiving one or more physical layer parameters from MBH transceivers in the MBH network, computing an admissible set of rate matrices, computing a capacity region based on the admissible set of rate matrices, deciding MBH transmission topology, and transmitting the decision to the MBH transceivers.

Another aspect of the present invention includes a network controller used in a mobile backhaul (MBH) network. The network controller comprises a reception means for receiving one or more physical layer parameters from MBH transceivers in the MBH network, a first computing means for computing an admissible set of rate matrices, a second computing means for computing a capacity region based on the admissible set of rate matrices, a decision means for deciding MBH transmission topology, and a transmission means for transmitting the decision to the MBH transceivers.

Still another aspect of the present invention includes a mobile backhaul (MBH) network comprising a network controller, MBH transceivers connected to the network controller, wherein the network controller receives one or more physical layer parameters from the MBH transceivers in the MBH network, computes an admissible set of rate matrices, computes a capacity region based on the admissible set of rate matrices, decides MBH transmission topology, and transmits the decision to the MBH transceivers.

Means herein can comprise one or more of various kinds of components such as, for example, software, a computer program, an electronic device, a computer, and/or a dedicated controller.

Gb/s fiber; Case VI: pre-aggregation=pt-to-pt wireless ($\theta_{ij}=\theta_{ji}=15°$), aggregation=2.5 Gb/s fiber.

DETAILED DESCRIPTION

Unlike in previous work, the problem is solved for practical cases with finitely-many network nodes, while also including physical parameters relevant to a typical MBH deployment which can include both wireless (microwave and free-space optical) and wired (e.g. fiber) links. Specifically, the MBH network planning problem is defined as a linear optimization problem in which the achievable capacity regions and/or uniform capacity of the network are computed for the adopted set of transmission protocols. Such an optimization framework enables the direct inclusion of physical-layer parameters into MBH network planning, while remaining sufficiently generic and malleable to cover a wide range of practical cases. It provides a software-defined way to both plan the MBH network topology prior to deployment, optimize and upgrade already existing networks, and gain insight into data rate scaling for future-proofing practical systems.

The solution enables the computationally-efficient, physically accurate, and software-reconfigurable determination of a heterogeneous MBH network topology which, out of all possible admissible topology combinations, enables the highest backhaul data rate in the network. Prior art focused either on all-wireless solutions and neglected optimization of the backhaul topology, and/or considered highly-theoretical cases with abstracted physical layer characteristics. The SD operation can enable cost-efficient, flexible MBH network planning, optimization and upgrades that can be readily customized to the network scenario at hand by the direct inclusion of relevant physical-layer parameters into the data rate maximization problem.

Figure 1:
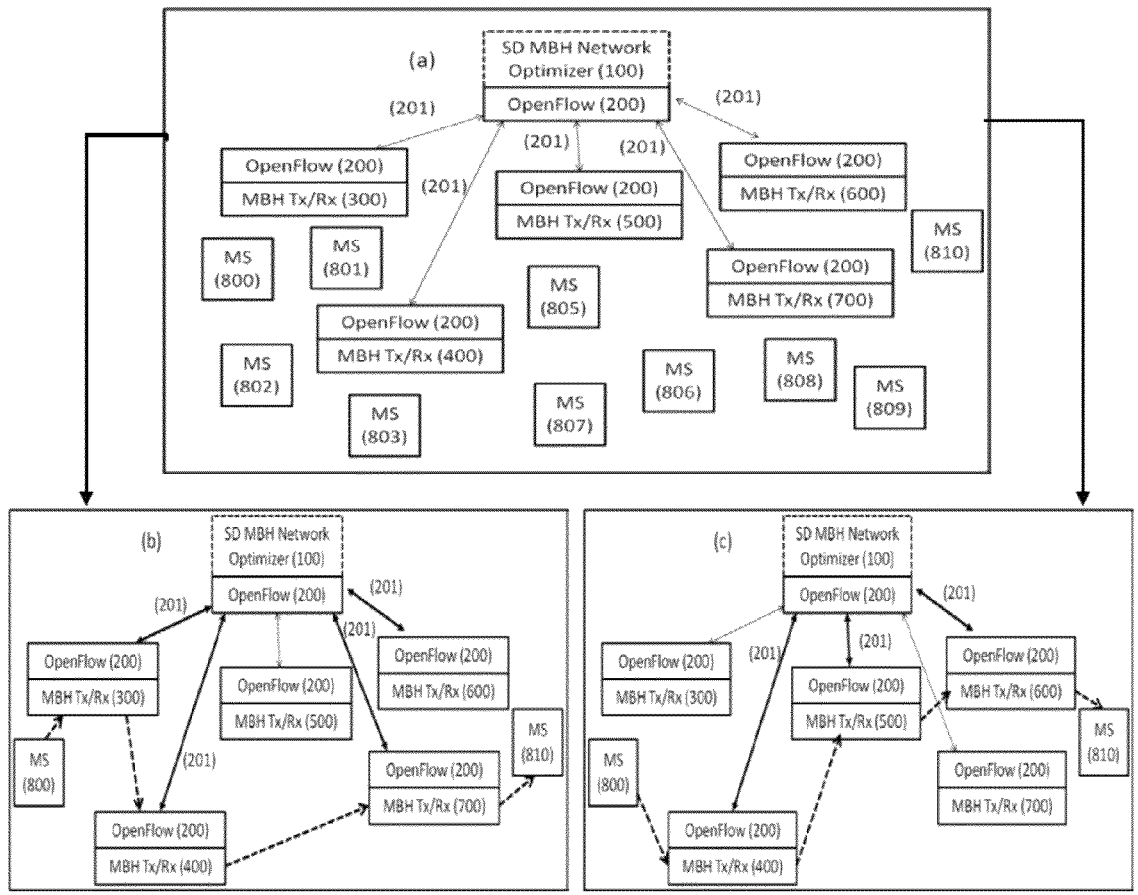
FIG. 1 depicts a software-defined MBH network optimization architecture (a) and two possible optimized topology options (b) and (c). SD=software-defined; MS=mobile station; Tx=transmitter; Rx=receiver.

The SD MBH network architecture optimization approach is illustrated in FIG. 1(*a*): at the core of the approach is the SD MBH network optimizer (100) or controller, including a software-defined algorithm used to plan and optimize the network architecture in order to maximize the data rate that the MBH network, i.e. MBH transceivers (Transmitter (Tx)/Receiver (Rx)) (300)-(700) in FIG. 1(*a*), can deliver to a set of mobile stations (MS), i.e. users, denoted by (800)-(810) in FIG. 1(*a*), given a fixed set of underlying transmission protocols that govern MBH Tx/Rx behavior (e.g. time division multiple access (TDMA)). Both the information about the physical-layer specifics of each MBH Tx/Rx (300)-(700) and the resulting decisions of the SD MBH network optimizer (100) are communicated from/to the remote MBH transceivers (Tx/Rx) (300)-(700) via generic parallel control messaging (201), for example using the OpenFlow protocol (200). A point addressed by the SD MBH network optimizer is that, depending on the type of the MBH links interconnecting the MBH Tx/Rx (300)-(700), i.e. fiber vs. point-to-point microwave, for example, a different route might be selected to maximize the MBH data rate between two users, e.g. MS (800) and MS (810). This is illustrated in FIGS. 1(*b*) and 1(*c*), where the bold solid arrows denote the active OpenFlow control messaging (201) between the SD network optimizer (100) and the MBH Tx/Rx (300), and the dashed arrows denote the MBH transmission topology selected to maximize the data rate between MS (800) and MS (810), as decided by the SD network optimizer (100) based on the specific physical-layer conditions and transmission protocol requirements at hand. It is noted that both options in FIG. 1(*b*) and FIG. 1(*c*) contain four hops between the source and destination MSs, (800) and (810) respectively, highlighting the inability of generic shortest-path algorithms to discriminate between physical-layer heterogeneity features of the network. In addition to thus maximizing the MBH data rate between MS source-destination pairs in a way that accounts for physical-layer specifics of the network, the SD controller can also be used to answer the following network planning, optimization, and upgrade questions:

If there are no wired (e.g. fiber) links in the network, where should these be placed? If fiber links exist, are they being used in a maximally efficient way? If not, what route/approach would be more efficient (i.e. resulting in a higher backhaul data rate)?

Given a legacy network topology, are there more optimal ways to route MBH traffic so as to increase the supported backhaul data rate between users?

It is also noted that, by addressing the second question above, in this approach, the MBH transmission topology selected by (100) is allowed to change as the traffic demands and patterns of the MSs (800)-(810) change; on the physical layer, this can be supported by point-to-point microwave or free-space optical links with adaptive directivity and spatial orientation. For wired links (e.g. fiber), topology morphing to accommodate changing network conditions is not feasible, such that the wired link subset would be exempt from topology re-optimization (i.e. rate matrices corresponding to such scenarios would be excluded from the capacity region computation outlined below; it is this computation that would determine the optimal MBH transmission topology). Finally, it is noted that while the illustrative case in FIG. 1(*a*) assumes the most flexible and general scenario in which no fixed a priori links exist between MBH Tx/Rx (300)-(700), i.e. that they can all be configured according to the decisions of the SD MBH network optimizer (100), this scenario can readily be constrained to cases with legacy fixed links, without loss of generality, by simply constraining the set of admissible rate matrices for the network as briefly described above, and as will be discussed and shown below.

FIG. 1 shows the SD MBH network optimizer (100), which operates by computing the capacity region of the underlying network given its physical-layer link parameters and set of transmission protocols. Specifically, the capacity region of a network is defined using a set of rate matrices that capture all needed information about the network activity at a given time. Each rate matrix is a function of an underlying transmission scheme that specifies which nodes are transmitting/receiving (Tx/Rx) whose data, and at what rate. The notation (i, k, j) expresses this succinctly, where (i) denotes the source, (k) denotes the relay, and (j) denotes the destination, respectively.

Thus, given a network of n nodes and a transmission scheme S, where S is defined as the full description of information flow between different nodes in the network at a given point in time (i.e. all transmit-receive node pairs in operation at the given time instant and their transmission rate), its rate matrix R(S) is a n×n matrix populated by entries data rate entries, $r_{ij}$, such that: $r_{ij}=r_{ij}$ if j receives information at rate $r_{ij}$ from i; $r_{ij}=-r_{ij}$ if j transmits information at rate $r_{ij}$ from i; and otherwise $r_{ij}=0$.

Moreover, to account for MBH traffic variability over time, it is assumed that the network will operate under different transmission schemes as active node pairs change due to different traffic demands. Such temporal evolution can be organized into slots of fractional length $a_i$ where $a_i \geq 0$ and $$\sum_{i=1}^{k} a_i = 1$$

The resulting time-division schedule of the network is given by $$T = \sum_{i=1}^{k} a_i S_i.$$

Since each transmission scheme $S_i$ corresponds to a rate matrix $R(S)$, the rate matrix of the time-division schedule is given by $$R(T) = R\left(\sum_{i=1}^{k} a_i S_i\right) = \sum_{i=1}^{k} a_i R(S_i) = \sum_{i=1}^{k} a_i R_i \quad (A)$$

It is thus the weighted ensemble of admissible rate matrices $R_i$ that defines the overall network time-division matrix $R(T)$, and ultimately the network's capacity region. Mathematically, if $\{R_1, \ldots, R_k\}$ denote the set of admissible rate matrices, the capacity region of the network is defined as $$C = C(\{R_i\}) = Co(\{R_i\}) = \left\{\sum_{i=1}^{k} a_i R_i : a_i \geq 0, \sum_{i=1}^{k} a_i = 1\right\} \quad (B)$$

where $Co(\{R_i\})$ denotes the convex hull of the set of $\{R_i\}$ admissible rate matrices. The word admissible is intentionally used to indicate that all rate matrices must abide by the imposed transmission protocol. For example, a given transmission protocol may only allow single-hop routing and may treat all interference as noise, while another may allow multi-hop routing and use successive interference cancellation. By determining the pool of admissible rate matrices, the transmission protocol directly governs the shape of the capacity region, which is in this way directly tied to concrete network topology, physical-layer parameters, as well as the adopted transmission protocol. The dimensionality of the capacity region can be as large as $n \times (n-1)$ since the network has n source nodes, each with up to $(n-1)$ possible destinations. For easier visualization, two-dimensional slices of C may be computed when only 2 of possible n nodes are active. Alternately, a uniform capacity metric, $C_u = r_{max} n \times (n-1)$ may be computed, corresponding to the largest transmission rate that all $n \times (n-1)$ communication pairs can support under time-division routing and a given transmission protocol. Furthermore, since the rate matrices for a n-node network are isomorphic to vectors with length $n \times (n-1)$, the resulting problem of computational geometry may be solved by linear programming as an optimization problem in $N-1$ Euclidean space as $$\text{minimize } g(x) = \sum_{i=1}^{N} x_i \quad (C)$$

$$\text{subject to } R = \sum_{i=1}^{N} x_i R_i$$

By iteratively solving the linear problem of (C), the vertices of the capacity regions, corresponding to optimal network modes of operation (i.e. MBH transmission topology), may be determined. However, to formally solve (C), the set of all admissible rate matrices must first be calculated, which may increase quite rapidly with the number of nodes, n. Significant speed gains may thus be obtained by recognizing that not all rate matrices significantly contribute to the capacity regions, and constructing smaller subsets of admissible rate matrices that accurately reproduce most of the capacity region. Cases where fixed a priori MBH links already exist are natural examples of this simplification, as mentioned above.

Finally, to relate the MBH transmission topology optimization with physical-layer parameters, the rate matrix entries, $r_{ij}$, which denote the data rate between source node (i) and destination node (j), are defined as a direct function of the effective signal-to-noise ratio (SNR), $\xi_{ij}$, on the source-destination link; in other words, $r_{ij} = f(\xi_{ij})$, where both the $\xi_{ij}$ computation and the choice of the function $f(\xi_{ij})$ can be varied in accordance with both the physical-layer technology employed (e.g. microwave vs. free-space optical vs. fiber transmission), as well as the desired data rate criterion. For example, $r_{ij}$ can be obtained as the maximum data rate that satisfies a given bit error rate (BER) requirement under a selected coding/modulation scheme for a given SNR, $\xi_{ij}$, which may be computed from the adopted coding, modulation, signal and noise power parameters. In an Additive White Gaussian Noise (AWGN) channel, which is the most common case for all of the MBH physical-layer technologies, closed form expressions based on the Gaussian Q-function may be used for $f(\xi_{ij})$ From this it also follows that improvements in $\xi_{ij}$ via physical-layer techniques such as modulation, detection and coding thus improve not only maximum link transmission rates, but also the achievable rates and the connectivity of the entire network. In the most ideal case, $f(\xi_{ij})$ can also be equated to the Shannon capacity of the link, which, for an AWGN channel, is given by $$f(\xi_{ij}) = W_{ij} \log_2(1 + \xi_{ij}) \quad (D)$$

where in (D) $\xi_{ij}$ is the link SNR and $W_{ij}$ is the physical bandwidth of the link. As mentioned above, depending on the physical-layer technology employed, the link SNR may be computed in customized ways, incorporating the crucial physical-layer specifics into the topology planning and optimization problem. For microwave links, for example, $\xi_{ij}$ can be calculated as $$\xi_{ij} = \frac{G_{ij} P_i}{\sigma_j^2 + \sum_k G_{kj} P_k} \quad (E)$$

where in (E), $P_i$ is the transmitted power, $G_{ij}$ is the channel gain coefficient from source (i) to destination (j), $\sigma_j^2$ is the AWGN variance, and the second term in the denominator of (E) accounts for any microwave interference on the link that is also treated as noise. For direction RF or free-space optical transmission, SNR $\xi_{ij}$ may be computed as $$\xi_{ij} = G_{ij} \frac{P}{\eta W} \frac{(2\pi)^2}{\theta_{ij} \theta_{ji}} \left(\frac{d_0}{d_{ij}}\right)^\alpha \quad (F)$$

where in (F), $\eta$ denotes the AWGN power spectral density, W is the bandwidth, P is transmitted power, $\theta_{ij}$ is the one-dimensional beam width of the signal, $d_{ij}$ is the Euclidean distance between the source and destination, $d_0$ is the reference distance based on which the effect of the path loss parameter $\alpha$ is computed, and the channel gain coefficient $G_{ij}$ accounts for any fading or shadowing effects. Finally, for $r_{ij}$ computation on optical fiber links, the SNR and optical SNR (OSNR) may be related as $$OSNR_{ij} = \frac{\rho R_s}{2B_{ref}} \xi_{ij} \quad (G)$$

where in (G), $\rho=1, 2$ for the cases of single-polarization and polarization-multiplexed optical signals, respectively, $R_s$ is the symbol rate, and $B_{ref}$ is the reference bandwidth for OSNR measurement (commonly taken as 12.5 GHz).

By using (D)-(G) to compute $r_{ij}$ entries in each admissible rate matrix, and substituting the rate matrices into a linear optimization routine to solve (A)-(C), the SD MBH network optimizer (100) computes the MBH transmission topology that supports the highest backhaul data rate, and enables flexible, software-reconfigurable network planning and optimization in a way that also incorporates the physical-layer specifics of every MBH link in the overall network. Finally, in cases where experimental measurements of $\xi_{ij}$ are available, these may also be readily used in the $r_{ij}$ computation in place of the analytical values given by (D)-(G).

Figure 2:
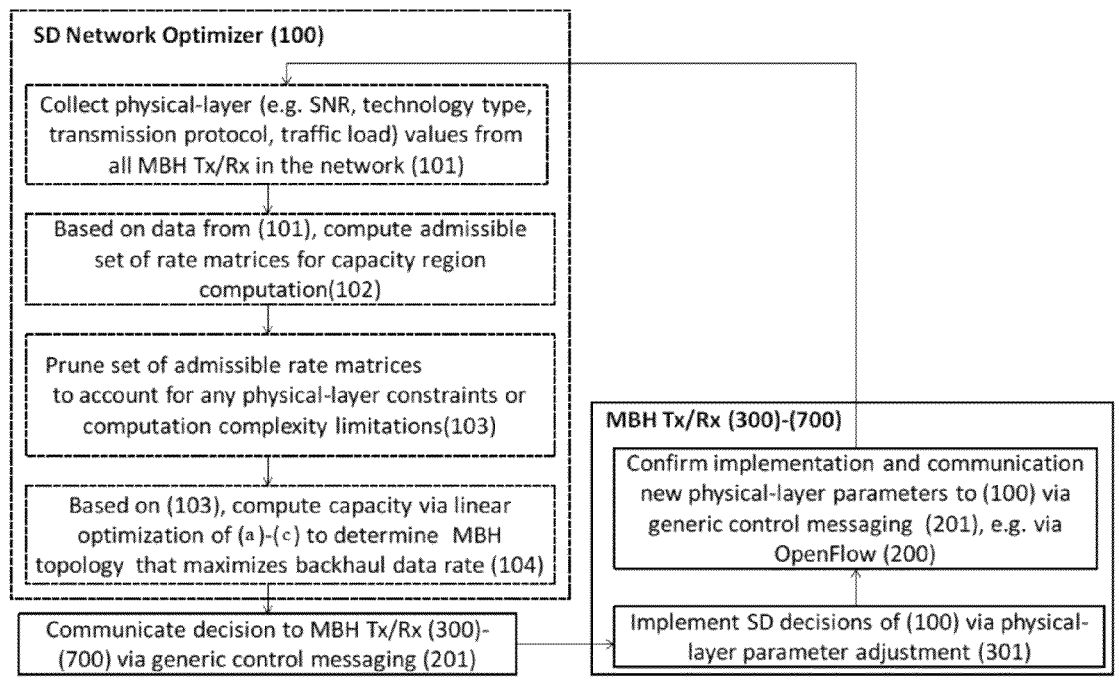
FIG. 2 depicts a detailed operational block diagram of the software-defined network optimizer (100).

FIG. 2 illustrates operational principles of the architecture. FIG. 2 shows the SD network optimizer (100) and its communication with the MBH Tx/Rx, denoted by (300)-(700) in FIG. 1; it is noted that the mobile users, i.e. MSs (800)-(810) in FIG. 1, do not participate in this process such that the MBH transmission topology optimization is abstracted from the end user for simplicity and ease of management. As shown in FIG. 2, the SD network optimizer (100) first collects the needed physical-layer data (101) from the MBH Tx/Rx (300)-(700) by an exchange of generic control messaging (201), which may be implemented via the OpenFlow interface (200), for example. The collected physical-layer parameters can include, but are not restricted to, the Tx/Rx technology type, link SNR/OSNR, adopted network transmission protocol, traffic load (i.e. number and data rate demands of MSs assigned to each MBH Tx/Rx), etc. Based on the physical-layer information compiled in (101), the network optimizer (100) computes the admissible set of rate matrices (102) that can be used for the capacity region and/or uniform capacity calculation. To account for any network constraints (e.g. fixed links, and/or computational complexity limitations), the SD network optimizer (100) can also prune the set of admissible rate matrices to a smaller sub-set (103). Based on the results of (103), the capacity computation is performed via linear optimization outlined in (A)-(C), to determine the MBH transmission topology which maximizes the backhaul data rate of the network (104). Finally, the MBH transmission topology results are communicated by the SD network optimizer (100) to the MBH Tx/Rx (300)-(700) via generic control messaging (201). To implement the decisions of (100), the MBH Tx/Rx (300)-(700) locally adjust the required physical layer parameters (301), and confirm the resulting modification and new operational parameters to the SD network optimizer (100) via generic control messaging (201), e.g. using OpenFlow (200). The updated physical-layer values can then be used by the SD optimizer (100) to re-optimize topology as needed, e.g. due to network upgrades and/or traffic changes.

The software-defined centralized controller (100) and its two-way communication and management of the remote MBH Tx/Rx (300)-(700) include the sequence of operations given by (101)-(104) in FIG. 2. By compiling and exploiting the physical-layer specifics of the network MBH Tx/Rx (300)-(700), the SD network optimizer (100) is able to compute a MBH transmission topology that, out of all possible admissible topology combinations, enables the highest backhaul data rate in the network. This is done through the customized linear optimization formulation of (101)-(104), through which the capacity regions and/or uniform capacity of the network can be accurately computed. Prior art focused either on purely wireless solutions and highly-theoretical cases with abstracted physical layer characteristics. Moreover, through the SD network optimization of (101)-(104) in FIG. 2, customized network planning and optimization are enabled in a software-reconfigurable way that supports physical-layer accuracy and is sufficiently malleable to accommodate an arbitrary mix of heterogeneous physical-layer MBH technologies and architectures.

The function blocks (101)-(104) enable the operation of the SD network optimizer (100) in FIG. 2. These features enable the efficient, accurate, and software-reconfigurable computation of a MBH network topology which, out of all possible admissible topology combinations, enables the highest backhaul data rate in the network. Prior art focused either on all-wireless solutions and neglected optimization of the backhaul topology, and/or considered highly-theoretical cases with abstracted physical layer characteristics. The SD operation can enable cost-efficient, flexible MBH network planning, optimization and upgrades that can be directly customized to the network scenario at hand by the direct inclusion of relevant physical-layer parameters into the data rate maximization problem.

Further System Details

We propose a software-defined algorithm for dynamic, physical-layer-aware throughput maximization in next-generation mobile backhaul (MBH) networks. Results confirm >100 Mb/s end-to-end per-cell throughputs with ≥2.5 Gb/s optical backhaul links deployed at legacy cell sites.

I. Introduction

The rapid proliferation of 4G and beyond mobile technologies is dramatically changing mobile backhaul (MBH) and access networks [6, 7]. High-density small cell deployments are transforming legacy last-mile MBH segments into pre-aggregation networks, with legacy macro cell sites evolving into aggregation points for a dozen or more small cells. Moreover, fiber-optic MBH is emerging as a highly-attractive complement to point-to-point wireless backhaul, particularly at high-density aggregation sites (e.g. legacy macro cells). Maximizing throughput of the resulting heterogeneous point-to-point wireless and optical MBH network thus becomes a critical technical and economic challenge. First, if fiber links already exist, are they being used with maximal efficiency? Secondly, if additional optical links need to be deployed the MBH network, where should these be placed to maximize throughput? In previous studies for legacy networks [1,3,5], throughput optimization via optimal cell site placement for randomly distributed mobile users was considered, yet the optimization of the cell site interconnections (i.e. MBH infrastructure) was not examined. In this paper, we introduce and evaluate a software-defined (SD) MBH throughput optimization algorithm which uses global knowledge of physical-layer MBH transmission topology (which can include both point-to-point wireless and optical links) to maximize per-cell end-to-end throughput, $r_{max}$, identify per-link bottlenecks, and assess $r_{max}$ gains that would arise by upgrading the bottleneck links. The algorithm is evaluated for a heterogeneous optical/wireless last-mile small cell backhaul network, confirming 4G LTE-compatible per-cell $r_{max}$=141.1 Mb/s with 2.5 Gb/s fiber links at legacy macro cell sites. The approach is thus attractive for optical MBH planning/optimization.

II. Software-Defined (SD) Optical MBH throughput Optimization Algorithm

Figure 3:
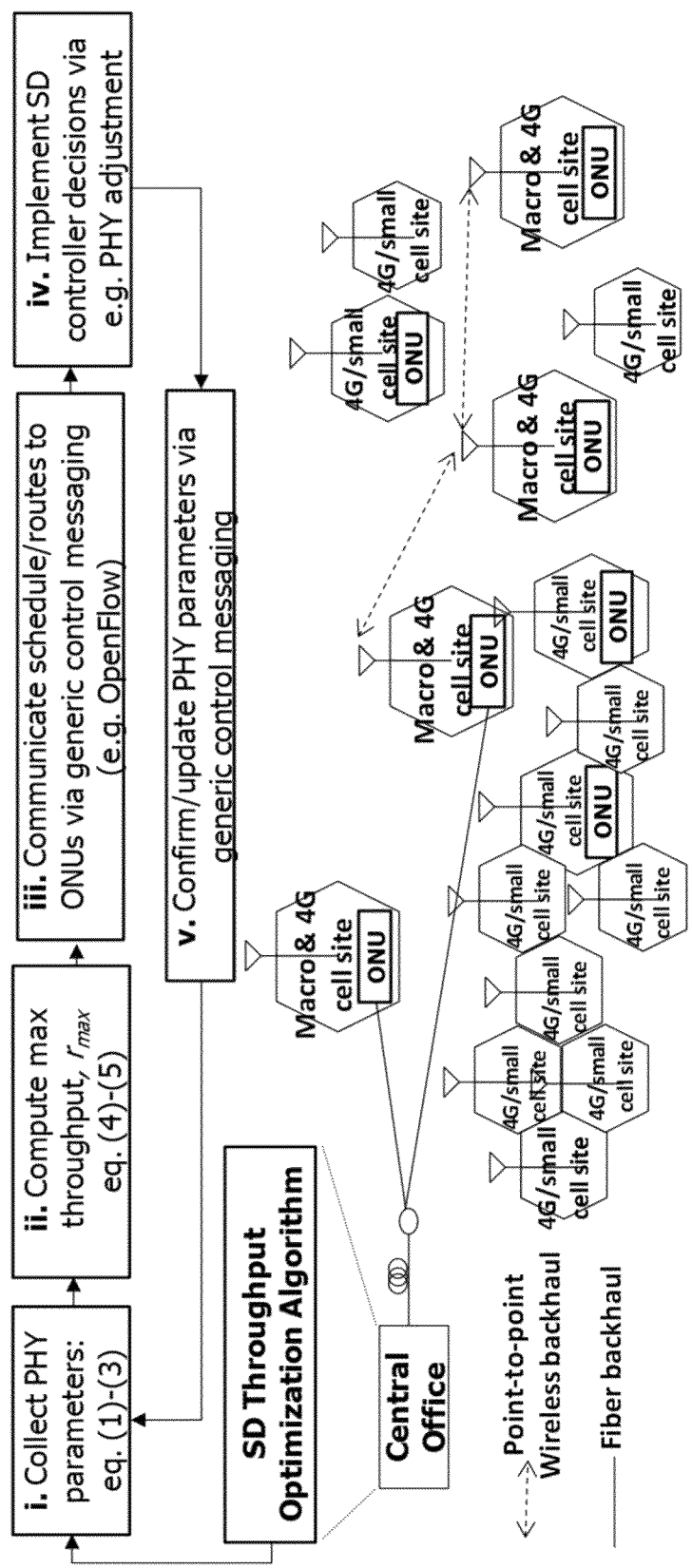
FIG. 3 depicts SD throughput optimization architecture for optical MBH.

As shown in FIG. 3, the SD algorithm seeks to optimize throughput in an evolving MBH network composed of both legacy (macro) and emerging (small cell) sites. Specifically, given a MBH network of n nodes and global knowledge of physical-layer link parameters (block i in FIG. 3), communicated via generic protocols (e.g. OpenFlow, block iii in FIG. 3), the SD computes the maximum achievable throughput rate, $r_{max}$, between all n/2 communication pairs (block ii in FIG. 3), where the same $r_{max}$ is required for all pairs for fairness. (Based on $r_{max}$, the aggregate network throughput can readily be computed as $r_{max} \times n/2$.) As shown in blocks i, ii, and iii in FIG. 3, the optimal value of $r_{max}$ will depend on both the physical per-link rates in the network, as well as on optimized scheduling/routing of the MBH data flows. To translate both parameters into the throughput optimization problem, we define a set of rate matrices, R, for the n-node network, wherein each R is a n×n matrix populated by physical per-link data rates, $r_{ij}$, such that: $r_{ij}=r_{ij}$ if node j receives information at rate $r_{ij}$ from node i; $r_{ij}=-r_{ij}$ if j transmits information at rate $r_{ij}$ from i; and $r_{ij}=0$ otherwise. At any given time, T=t, the corresponding rate matrix, R(t), thus contains all data flow information in the network. The rate matrix entries, $r_{ij}$, can then be computed based on the effective signal-to-noise ratio (SNR), $\xi_{ij}$, on each MBH link. For ideal AWGN channels, $r_{ij}=W_{ij} \log_2(1+\xi_{ij})$, where $\xi_{ij}$ denotes link SNR and $W_{ij}$ is physical bandwidth. For non-ideal wireless MBH links, $\xi_{ij}$ can be computed as $$\xi_{ij} = \frac{G_{ij}P_i}{\sigma_j^2 + \sum_k G_{kj}P_k} \quad (1)$$

where $P_i$ is the transmitted power, $G_{ij}$ is the channel gain coefficient, $\sigma_j^2$ is the AWGN noise variance, and the second term in the denominator accounts for any interference that is also treated as noise [1]. For point-to-point wireless links, $\xi_{ij}$ may be computed as:

$$\xi_{ij} = G_{ij} \frac{P_i}{\sigma_j^2} \frac{(2\pi)^2}{\theta_{ij}\theta_{ji}} \left(\frac{d_0}{d_{ij}}\right)^\alpha \quad (2)$$

where $\theta_{ij}$ and $\theta_{ji}$ are the one-dimensional antenna beam widths, $d_{ij}$ is the Euclidean distance between nodes i and j, and $d_0$ is the reference distance based on which the effect of the free-space path loss parameter α is computed [1]. Finally, for $r_{ij}$ computation on optical fiber links, the SNR and optical SNR (OSNR) may be related as $$OSNR_{ij} = \frac{\rho R_s}{2B_{ref}}\xi_{ij} \quad (3)$$

where ρ=1, 2 for single- and dual-polarization signals, respectively, $R_s$ is the symbol rate, and $B_{ref}$ is the OSNR reference bandwidth. To then account for MBH traffic variability over time, T, and dynamically optimize scheduling/routing, the temporal evolution is modeled by fractional time slots $$t_k \geq 0, \sum_{k=1}^{N} t_k = 1,$$

where N denotes the number of slots. The rate matrix of the dynamic network, $R_{DN}$, is then given by $$R_{DN} = \sum_{k=1}^{N} t_k R_k \quad (4)$$

wherein each $R_k$ in (4) is populated by physical per-link rates $r_{ij}$ of (1)-(3). The optimal $R_{DN}$ is then found by computing the schedule, $\{t_k, k=1, \ldots, N\}$, which enables the highest effective throughput rate, $r_{max}$, between all communication pairs in the network. Mathematically, for a n-node network, the dimensionality of $R_{DN}$ in (4) is isomorphic to vectors with length n(n−1), such that (4) may be solved as a linear optimization problem in N−1 Euclidean space as $$\text{minimize} \sum_{k=1}^{N} t_k \quad (5)$$

$$\text{subject to } R_{DN} = \sum_{k=1}^{N} t_k R_k$$

The result of (5) can then be exploited by the SD MBH controller (FIG. 3) to make the traffic routing/scheduling decisions that maximize overall throughput, as well as to identify network bottlenecks (i.e. those links/hops that require longer scheduling slots, $t_k$), and evaluate throughput effects of cell site MBH upgrades to fiber connectivity. Moreover, such optimization can be done in a software-reconfigurable way, accounting for real-time changes in traffic demands and patterns.

III. SD MBH throughput Optimization Results and Analysis

Figure 4:
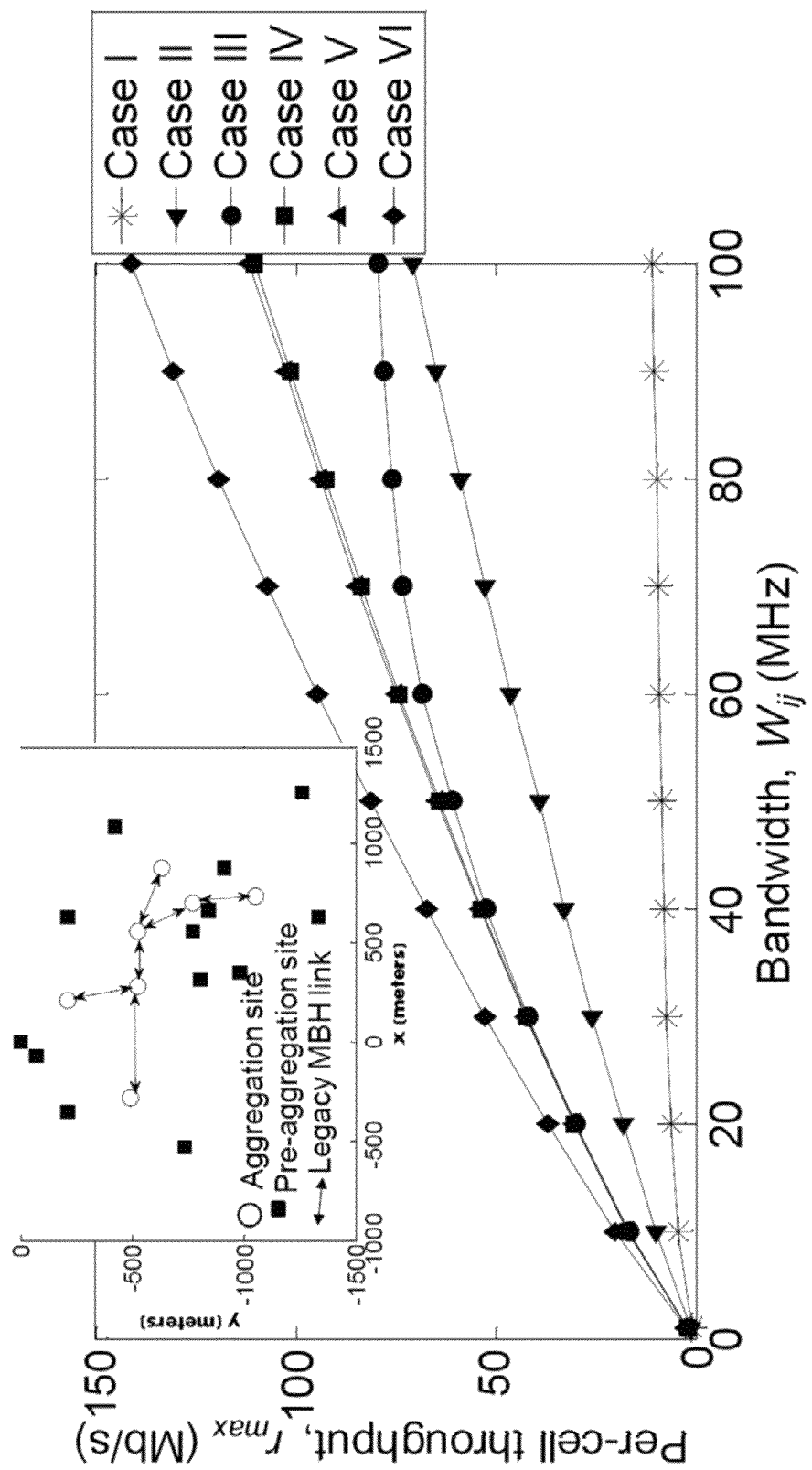
FIG. 4 depicts per-cell throughput rate, rmax, versus bandwidth, Wij (MHz); Case I: pre-aggregation=omni-directional wireless, aggregation=pt-to-pt wireless ($\theta_{ij}=\theta_{ji}=30°$); Case II: pre-aggregation=pt-to-pt wireless ($\theta_{ij}=\theta_{ji}=30°$), aggregation=pt-to-pt wireless) ($\theta_{ij}=\theta_{ji}=15°$); Case III: pre-aggregation=pt-to-pt wireless ($\theta_{ij}=\theta_{ji}=30°$), aggregation=1 Gb/s fiber; Case IV: pre-aggregation=pt-to-pt wireless ($\theta_{ij}=\theta_{ji}=30°$), aggregation=2.5 Gb/s fiber; Case V: pre-aggregation=pt-to-pt wireless ($\theta_{ij}=\theta_{ji}=30°$), aggregation=10

The SD throughput maximization algorithm was evaluated on the MBH network of the inset of FIG. 4, formed by n=20 nodes randomly distributed on a 3.75 km² ≈ 1.5 mi² (e.g. last mile) rectangular area and mapped into n/2=10 source-destination pairs. As shown in the inset of FIG. 4, each dark square denotes a new small cell ("pre-aggregation") site targeted for point-to-point wireless backhaul, while each light circle indicates a co-located legacy macro/new small-cell ("aggregation") site, already featuring legacy point-to-point wireless backhaul and potentially requiring an upgrade to fiber connectivity. In other words, for the legacy MBH sites, which both originate traffic and must route traffic to/from other cells, the SD algorithm seeks to evaluate throughput effects of MBH link upgrades to optical fiber. To compute $r_{max}$ for each target MBH case I-VI in FIG. 4, all per-link rates, $r_{ij}$, for the network in the inset of FIG. 4 were first calculated for the according to (1)-(3), wherein, unless otherwise noted $P_i=0.1$ Watts, $d_{ij}$ values were taken from the geometry of the inset of FIG. 4, $d_0=70$ m, $\alpha=3$, $\sigma_j^2=W_{ij}\times 10^{-5}$, $\rho=1$, and $B_{ref}=12.5$ GHz. A linear optimization routine was implemented in MATLAB to compute $r_{max}$ using the rate matrix formulation of (4)-(5), with the per-cell maximum throughput, $r_{max}$, plotted in FIG. 4 versus wireless MBH bandwidth, $W_{ij}$ (MHz); as shown in FIG. 4, for all cases, low $W_{ij}$ values created severe local MBH bottlenecks and limited $r_{max} \leq 20$ Mb/s despite fiber connectivity, highlighting the importance of this parameter. As also shown in FIG. 4, while the upgrade of legacy sites to 1 Gb/s fiber backhaul (Case III) improved $r_{max}$ compared to both all-wireless MBH scenarios (Cases I and II), an additional upgrade of legacy sites to 2.5 Gb/s fiber links (Case IV) was required to alleviate routing/scheduling bottlenecks and enable $r_{max}=100$ Mb/s, corresponding to 4G LTE data rates. We note that this numerical optimization result (i.e. 2.5 Gb/s fiber-optic backhaul rate for n=20 cells in a last-mile scenario) is in line with previous analytical and experimental evaluations of 24-25 Gb/s/λ optical MBH rates for n≈200 cell last-mile backhaul [7]. Moreover, as shown in FIG. 4 for Case V, a further upgrade of legacy sites of the inset of FIG. 4 to 10 Gb/s fiber backhaul provided virtually no $r_{max}$ gains because, in this case, end-to-end throughput was limited by the substantially lower rates on the wireless backhaul links. This was confirmed by the results of Case VI, where $r_{max}=141.1$ Mb/s was achieved by upgrading legacy MBH sites to 2.5 Gb/s fiber links and by adopting more advanced antenna directionality to increase the point-to-point wireless pre-aggregation segment MBH rates.

CONCLUSIONS

We have proposed and evaluated a software-defined throughput maximization algorithm for next-generation optical MBH. Results show that judiciously placed 2.5 Gb/s optical backhaul links can notably increase throughput in heterogeneous 4G MBH systems and support software-reconfigurable network planning The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method implemented in a network controller used in a mobile backhaul (MBH) network, the method comprising: receiving one or more physical layer parameters from MBH transceivers in the MBH network; computing an admissible set of rate matrices; computing a capacity region based on the admissible set of rate matrices; deciding MBH transmission topology; and transmitting the decision to the MBH transceivers, wherein rate matrix entry $r_{ij}$, which denote a data rate between source node i and destination node j, is expressed as a function of signal-to-noise ratio (SNR) $\xi_{ij}$ on a source-destination link:

$r_{ij}=f(\xi_{ij})$, wherein the SNR is calculated according to a formula that can be expressed as $$\xi_{ij} = G_{ij} \frac{P}{\eta W} \frac{(2\pi)^2}{\theta_{ij}\theta_{ji}} \left(\frac{d_0}{d_{ij}}\right)^\alpha$$

for direction radio frequency (RF) or free-space optical transmission, where η denotes an Additive White Gaussian Noise (AWGN) power spectral density, W is a bandwidth, P is transmitted power, $\theta_{ij}$ is a one-dimensional beam width of a signal, $d_{ij}$ is a Euclidean distance between source node i and destination node j, $d_0$ is a reference distance based on which an effect of path loss parameter α is computed, and channel gain coefficient $G_{ij}$ accounts for a fading or shadowing effect.

2. The method as in claim 1, wherein said one or more physical layer parameters include at least one of a signal-to-noise ratio (SNR), an optical SNR, a transceiver technology type, a transmission protocol, and a traffic load.

3. The method as in claim 1, further comprising:
pruning the admissible set of rate matrices to account for a physical-layer constraint or a computation complexity limitation.

4. The method as in claim 1, wherein the MBH transmission topology is decided by minimizing $$\sum_{i=1}^{N} x_i \quad (C)$$

subject to $R = \sum_{i=1}^{N} x_i R_i$, where $R_i$ denotes an admissible rate matrix, $\{R_i\}=\{R_1, \ldots, R_i, \ldots, R_N\}$ is a set of admissible rate matrices, R is a rate matrix of a time-division schedule, and $x_i$ is a coefficient for $R_i$ to solve an optimization problem expressed as (C).

5. The method as in claim 1, wherein $r_{ij}$ is obtained as a maximum data rate that satisfies a given bit error rate (BER) requirement under a selected coding or modulation scheme for given SNR $\square_{ij}$.

6. The method as in claim 5, wherein the given SNR is computed from at least one of adopted coding, adopted modulation, and a signal and noise power parameter.

7. The method as in claim 1, wherein the function can be expressed as $f=(\xi_{ij})=W_{ij} \log_2(1+\xi_{ij})$, where $W_{ij}$ is a physical bandwidth of the source-destination link.

8. The method as in claim 1, wherein the SNR for an optical fiber link (optical SNR, OSNR) is calculated according to a formula that can be expressed as $$OSNR_{ij} = \frac{\rho R_s}{2B_{ref}}\xi_{ij},$$

where ρ=1, 2 for single-polarization and polarization-multiplexed optical signals, respectively, $R_s$ is a symbol rate, and $B_{ref}$ is a reference bandwidth for OSNR measurement.

9. The method as in claim 1, wherein the decision is transmitted to the MBH transceivers via OpenFlow control messaging.

10. A network controller used in a mobile backhaul (MBH) network, the network controller comprising: a reception means for receiving one or more physical layer parameters from MBH transceivers in the MBH network; a first computing means for computing an admissible set of rate matrices; a second computing means for computing a capacity region based on the admissible set of rate matrices; a decision means for deciding MBH transmission topology; and a transmission means for transmitting the decision to the MBH transceivers, wherein rate matrix entry $r_{ij}$, which denote a data rate between source node i and destination node j, is expressed as a function of signal-to-noise ratio SNR $\xi_{ij}$ on a source-destination link:

$$r_{ij}=f(\xi_{ij}),$$

wherein the SNR is calculated according to a formula that can be expressed as $$\xi_{ij} = G_{ij} \frac{P}{\eta W} \frac{(2\pi)^2}{\theta_{ij}\theta_{ji}} \left(\frac{d_0}{d_{ij}}\right)^\alpha$$

for direction radio frequency (RF) or free-space optical transmission,
where η denotes an Additive White Gaussian Noise (AWGN) power spectral density, W is a bandwidth P is transmitted power, $\theta_{ij}$ is a one-dimensional beam width of a signal, $d_{ij}$ is a Euclidean distance between source node i and destination node j, $d_0$ is a reference distance based on which an effect of path loss parameter α is computed, and channel gain coefficient $G_{ij}$ accounts for a fading or shadowing effect.

11. A mobile backhaul (MBH) network comprising: a network controller; MBH transceivers connected to the network controller, wherein the network controller receives one or more physical layer parameters from the MBH transceivers in the MBH network, computes an admissible set of rate matrices, computes a capacity region based on the admissible set of rate matrices, decides MBH transmission topology, and transmits the decision to the MBH transceivers, wherein rate matrix entry $r_{ij}$, which denote a data rate between source node i and destination node j, is expressed as a function of signal-to-noise ratio SNR on a source-destination link:

$$r_{ij}=f(\xi_{ij}),$$

wherein the SNR is calculated according to a formula that can be expressed as $$\xi_{ij} = G_{ij} \frac{P}{\eta W} \frac{(2\pi)^2}{\theta_{ij}\theta_{ji}} \left(\frac{d_0}{d_{ij}}\right)^\alpha$$

for direction radio frequency (RF) or free-space optical transmission,
where η denotes an Additive White Gaussian Noise (AWGN) power spectral density, W is a bandwidth, P is transmitted power, $\theta_{ij}$ is a one-dimensional beam width of a signal, $d_{ij}$ is a Euclidean distance between source node i and destination node j, $d_0$ is a reference distance based on which an effect of path loss parameter α is computed, and channel gain coefficient $G_{ij}$ accounts for a fading or shadowing effect.

* * * * *